United States Patent
Selvaraj

(10) Patent No.: US 10,331,773 B1
(45) Date of Patent: Jun. 25, 2019

(54) GENERATING CUSTOMIZED RESOURCE IDENTIFIERS FOR PARCELS

(71) Applicant: Amazon Technologies, Inc., Seattle, WA (US)

(72) Inventor: Supreeth Selvaraj, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 15/607,230

(22) Filed: May 26, 2017

Related U.S. Application Data

(62) Division of application No. 14/493,114, filed on Sep. 22, 2014, now Pat. No. 9,678,930.

(51) Int. Cl.
| | |
|---|---|
| *G06F 17/00* | (2019.01) |
| *G06F 17/22* | (2006.01) |
| *G06F 17/27* | (2006.01) |
| *G06Q 50/28* | (2012.01) |
| *G06F 16/955* | (2019.01) |
| *G06F 16/951* | (2019.01) |

(52) U.S. Cl.
CPC ...... *G06F 17/2247* (2013.01); *G06F 17/2765* (2013.01); *G06F 16/951* (2019.01); *G06F 16/955* (2019.01); *G06F 16/9558* (2019.01); *G06F 16/9566* (2019.01); *G06F 17/22* (2013.01); *G06Q 50/28* (2013.01)

(58) Field of Classification Search
CPC .. G06F 16/951; G06F 16/9566; G06F 16/955; G06F 16/9558
See application file for complete search history.

(56) References Cited

U.S. PATENT DOCUMENTS

| | | | | |
|---|---|---|---|---|
| 8,583,795 | B2 * | 11/2013 | Chor | H04L 67/02 709/225 |
| 8,600,902 | B2 * | 12/2013 | Kumar | G06Q 20/382 705/1.1 |
| 9,047,259 | B1 * | 6/2015 | Ho | G06F 16/9558 |
| 9,111,211 | B2 * | 8/2015 | Mason | G06N 5/00 |
| 9,128,896 | B2 * | 9/2015 | Mason | G06Q 10/00 |
| 9,135,211 | B2 * | 9/2015 | Stern | G06F 15/173 |
| 9,135,344 | B2 * | 9/2015 | Mason | G06F 16/9535 |
| 9,411,900 | B2 * | 8/2016 | Vishria | G06F 16/9566 |

(Continued)

OTHER PUBLICATIONS https://web.archive.org/web/20131110012000/http://www.meaningfulurl.com/faq.php, Nov. 10, 2013, 1 page.

*Primary Examiner* — Mohammed H Zuberi
(74) *Attorney, Agent, or Firm* — Athorus, PLLC

(57) ABSTRACT

A locator (e.g., a URL) associated with a network-based resource, such as a web page, may be customized in a manner that increases the likelihood that one or more viewers of the locator will remember and utilize the locator in order to access the network-based resource at a later time. The locator may include words or combinations of words that are associated with attributes of the network-based resource (e.g., the contents of the web page), the viewers or a context in which the locator is presented to the viewers. The words or combinations may be selected such that a length of the locator is less than a length of another locator that is permanently associated with the network-based resource. The locator may be presented to the viewers in any context, such as on a billboard, in an audio or video message, or on a shipping label affixed to a parcel.

20 Claims, 11 Drawing Sheets

(56) References Cited

U.S. PATENT DOCUMENTS

| | | | | |
|---|---|---|---|---|
| 9,413,715 | B2* | 8/2016 | Chor | H04L 67/02 |
| 9,582,592 | B2* | 2/2017 | Mason | G06F 17/2247 |
| 9,582,810 | B2* | 2/2017 | Wingle | G06Q 30/0241 |
| 9,602,660 | B2* | 3/2017 | Velthuis | H04M 3/42382 |
| 9,619,811 | B2* | 4/2017 | Mason | G06Q 30/02 |
| 9,621,631 | B2* | 4/2017 | Zises | G06F 21/32 |
| 9,665,883 | B2* | 5/2017 | Roullier | G06Q 30/0242 |
| 9,674,259 | B1* | 6/2017 | Venkatasubramanian | H04L 67/02 |
| 9,678,930 | B1* | 6/2017 | Selvaraj | H04L 67/02 |
| 9,710,566 | B2* | 7/2017 | Ainslie | G06F 3/0484 |
| 9,754,293 | B1* | 9/2017 | Wingle | G06Q 30/0276 |
| 9,766,797 | B2* | 9/2017 | Chakra | G06F 17/2264 |
| 9,811,783 | B2* | 11/2017 | Hyder | G06Q 10/00 |
| 10,075,533 | B2* | 9/2018 | Cockcroft | G06F 16/9566 |
| 2004/0044791 | A1 | 3/2004 | Pouzzner | |
| 2007/0124414 | A1 | 5/2007 | Bedingfield et al. | |
| 2008/0010683 | A1 | 1/2008 | Baddour et al. | |
| 2011/0264992 | A1 | 10/2011 | Vishria et al. | |
| 2012/0055984 | A1* | 3/2012 | Van Megchelen | H04L 61/3025 235/375 |
| 2013/0073745 | A1 | 3/2013 | Bilinski et al. | |
| 2015/0264105 | A1 | 9/2015 | V. | |
| 2017/0300854 | A1* | 10/2017 | Harcar | G06Q 10/087 |

* cited by examiner

FIG. 4

| WORD | DEFINITION | PART OF SPEECH | CATEGORY | PREFERENCES FOR USE | | RESTRICTIONS ON EFFECTIVENESS | |
|---|---|---|---|---|---|---|---|
| | | | | AGE | GEOGRAPHY | AGE | GEOGRAPHY |
| ... | ... | ... | ... | ... | ... | ... | ... |
| bass | of or pertaining to a low pitch, esp. in music | adjective | music | | | | |
| ... | ... | ... | ... | ... | ... | ... | ... |
| bass | an edible freshwater or sea fish of the Perciformes order, characterized by spiny dorsal fins | noun | food & dining | 30-65 | Florida | none | none |
| ... | ... | ... | ... | ... | ... | ... | ... |
| croak | to expel a hoarse, rough sound, esp. by a frog | verb | physiology | all | coastal regions | 65-80 | none |
| croak | to perish | verb | nature | ... | ... | ... | ... |
| ... | ... | ... | ... | ... | ... | ... | ... |
| grind | to reduce to fine particles | verb | food & dining | 25-40 | Seattle, Portland | none | none |
| grind | to engage in the performance of a difficult task | verb | physiology | 15-25 | all | 35-80 | none |
| ... | ... | ... | ... | ... | ... | ... | ... |
| husky | a breed of Arctic sled dog, characterized by thick fur and pointed ears | noun | nature | all | United States, generally | none | North Carolina, Kentucky |
| husky | big, strong, burly | adjective | biology | ... | ... | ... | ... |
| ... | ... | ... | ... | ... | ... | ... | ... |
| mad | angry, upset, maniacal | adjective | sociology | 35-80 | all | 15-25 | none |
| mad | to a more extreme extent, very (slang) | adverb | linguistics | 15-25 | all | 35-80 | none |
| ... | ... | ... | ... | ... | ... | ... | ... |
| record | to set down or register information | verb | music | 35-65 | all | 0-20 | none |
| record | a flat, circular disc having an inscribed groove embodying a preserved audio sound | noun | music | 45-70 | all | 0-25 | none |
| ... | ... | ... | ... | ... | ... | ... | ... |
| sock | a short article of clothing for covering a foot | noun | clothing | all | Boston | none | New York |
| sock | to strike, esp. with force; to leave an impression | verb | physics | ... | ... | ... | ... |
| ... | ... | ... | ... | ... | ... | ... | ... |
| yankee | a native or inhabitant of a northern U.S. state, esp. during American Civil War | noun | history | 25-75 | New England, New York | 25-75 | Boston, Southern U.S. |
| yankee | a word for phonetically representing the letter Y | noun | linguistics | ... | ... | ... | ... |
| ... | ... | ... | ... | ... | ... | ... | ... |

NETWORK SITE: MOTORCYCLE SPARE PARTS AND ACCESSORIES
PROSPECTIVE VIEWERS: TYPICALLY MALES, AGED 20-45
CONTEXT: BILLBOARDS AND STREET SIGNS

| WORD COMBINATION | OBSERVED EFFECTIVENESS |
|---|---|
| tail-gunner | 0.93 |
| land-chopper | 0.92 |
| laughing-gas | 0.88 |
| gone-fishtailing | 0.81 |
| coupon-clipper | 0.79 |
| busted-grape | 0.78 |
| baby-throttle | 0.66 |
| belly-shover | 0.62 |
| century-club | 0.52 |
| twisted-wick | 0.49 |

| WORD | RELATION TO SITE, VIEWERS OR CONTEXT |
|---|---|
| bike | 1.00 |
| helmet | 0.98 |
| speed | 0.95 |
| rocket | 0.82 |
| warrior | 0.79 |
| two-wheeler | 0.70 |
| adult | 0.61 |
| opportunity | 0.49 |
| grown up | 0.42 |
| balance | 0.26 |

FIG. 7

GENERATING CUSTOMIZED RESOURCE IDENTIFIERS FOR PARCELS

CROSS-REFERENCE TO RELATED APPLICATIONS

This application is a divisional of U.S. patent application Ser. No. 14/493,114, filed Sep. 22, 2014, the contents of which are incorporated by reference herein in their entirety.

BACKGROUND

Network-based resources such as web pages, documents, media or other files may be presented to users on computing devices that are equipped with specific applications commonly called browsers. A browser is a client-side application that is configured to receive resources that are hosted on one or more server-side devices, and to process and render such resources on one or more computing displays after receiving a request for such content. The request may include a Uniform Resource Identifier ("URI"), such as a Uniform Resource Locator (or "URL"), associated with a network-based resource that includes the requested content, or another location of files that include the requested content. For example, a request for network-based content may comprise an entry of a URI or a URL into an address box or address bar of a browser; a selection of an image or set of text rendered by the browser or another application that may be hyperlinked to a URI or a URL; or a selection of a bookmark, a "home" button or any other feature of the browser that may be hyperlinked to or otherwise associated with a URI or a URL. Upon receiving the request from the browser, a server associated with the URI or URL handles the request by providing code expressed in one or more computer languages, such as Hypertext Markup Language (or "HTML"), to the browser, which then uses one or more rendering engines (or layout engines) to render the code provided by the server into a page, which may include one or more files embedded within the code provided by the server.

A typical URI, such as a URL, includes a specific string of characters and punctuation marks that provide a direct reference to one or more files associated with a network-based resource. For example, a URL may include a reference to a scheme or a protocol, such as Hypertext Transfer Protocol (or "HTTP"), as well as a host name and top-level domain (such as .com or .org), followed by a description of a file path according to a predetermined syntax in which folders, directories or file names are listed as separated by slashes. Thus, a URL may represent a virtual road map for locating and accessing network-based resources maintained at one or more servers or like machines associated with the host name and within the one or more folders or directories. The URL may be typed by a user into an address box or address bar of a browser, or provided in a hyperlink to a document (e.g., a word processing document, an electronic message or a portion of another network-based resource) and selected by the user, in order to access the network-based resource with which the URL is associated.

At an international level, the Internet Corporation for Assigned Names and Numbers (or "ICANN") manages the distribution of domain names and is responsible for implementing the Domain Name System (or "DNS") around the globe. The advent of the World Wide Web and the rapid proliferation of Internet-enabled devices on which such content may be accessed have caused most of the brief, easy-to-remember domain names to be purchased and held by Internet developers, and such domain names are now increasingly scarce. Therefore, many URLs include multiple words formed in long, drawn out phrases, as well as variations on such words or phrases that are intended to uniquely identify the network-based resources with which they are associated. Moreover, in view of the broad diversification of content that is now available on the Internet, many URLs include lengthy file paths that reference multiple folders or directories, or may trigger the operation of one or more functions. In this regard, a URL may be very lengthy and may have little to no etymologic or apparent relation to a network-based resource with which they are associated, and may often be difficult to remember and spell correctly by users who view the URLs and wish to access the underlying network-based resource at a later time.

BRIEF DESCRIPTION OF THE DRAWINGS

FIG. 4 is a set of data for consideration by one system for generating customized resource identifiers in accordance with embodiments of the present disclosure.

FIG. 7 is a set of data for consideration by one system for generating customized resource identifiers in accordance with embodiments of the present disclosure.

DETAILED DESCRIPTION

As is set forth in greater detail below, the present disclosure is directed to automatically generating customized resource identifiers of network-based resources, such as URLs. More specifically, some embodiments of the present disclosure are directed to identifying a word, or a combination of words, that is relevant to the contents of a network-based resource, or to one or more prospective viewers of the network-based resource, and generating an identifier comprising the word or the combination of words, and linking the identifier to the network-based resource. The identifier may then be provided to one or more prospective viewers of the network-based resource in any number of contexts, e.g., in one or more physical or virtual contexts. By customizing the process by which the words or the combination of words are selected for inclusion in a customized identifier, the likelihood that a user will recall the identifier at a later time, and access the network-based resource using the identifier, e.g., by providing the identifier to a browser or other application, may be enhanced.

Figure 1:
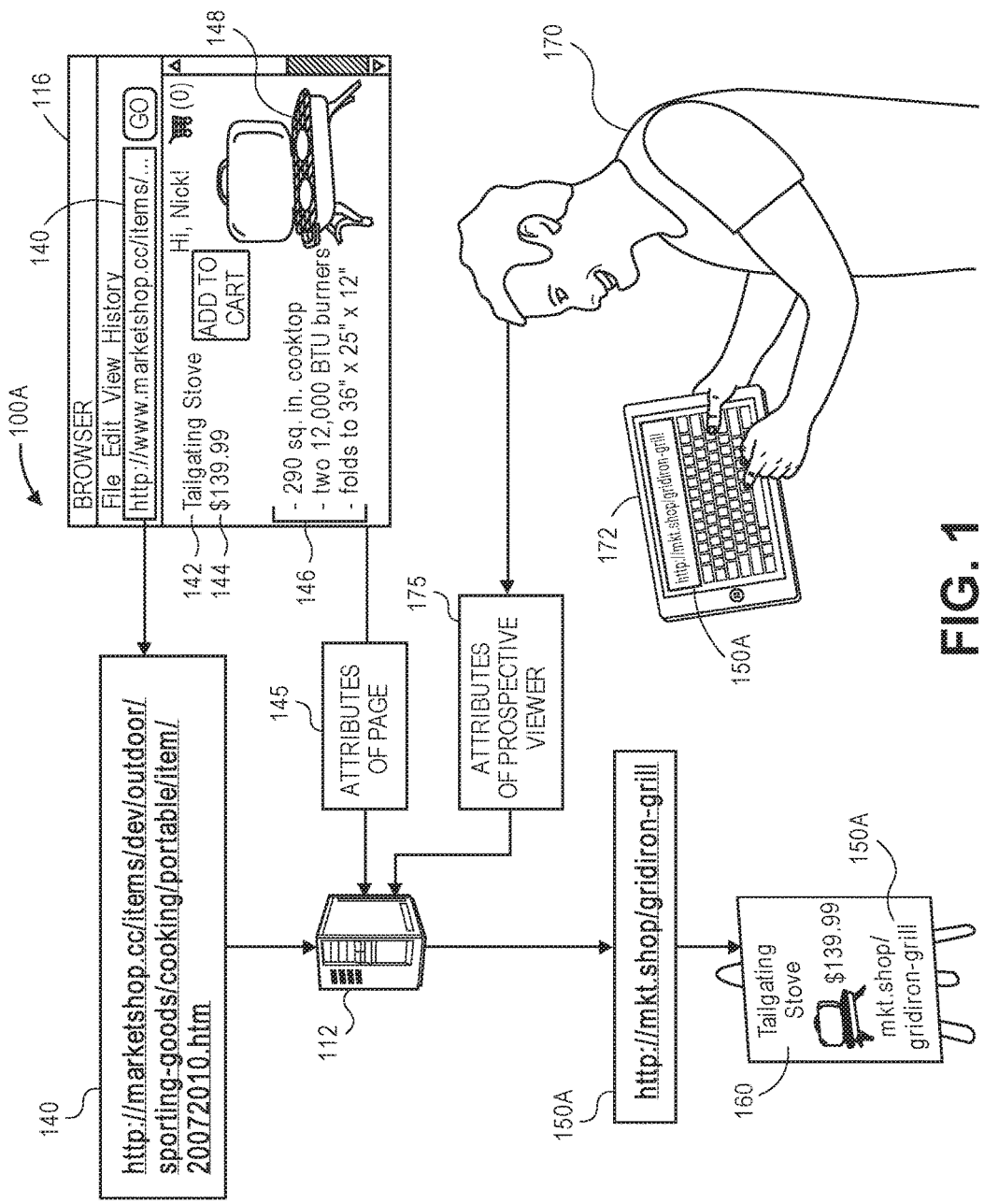
FIG. 1 is a flow diagram of one system for generating customized resource identifiers in accordance with embodiments of the present disclosure.

Referring to FIG. 1, one system 100 for generating customized resource identifiers in accordance with embodiments of the present disclosure is shown. The system 100 includes a server 112, a network page (e.g., web page) 116 and an advertisement 160 provided in a context within a field of view of a customer 170. The network page 116 is identified by a URL 140 and includes information regarding an item that may be available for purchase via the network page 116, such as a name or title 142 of the item (viz., a stove for outdoor cooking, particularly at tailgate parties), a price 144 of the item, details 146 of the item (e.g., cooking features and capacities of the stove) and an image 148 of the item.

As is shown in FIG. 1, the URL 140 associated with the network page 116 includes a domain name and a file path having several folders or directories. In accordance with some embodiments of the present disclosure, a customized resource identifier may be generated and associated with the network page 116 based on attributes 145 of the network page 116 (e.g., one or more of the title 142, the price 144, the details 146 or the image 148, or any other relevant information), attributes 175 of prospective viewers, such as the customer 170, who may encounter the advertisement 160 (e.g., names, identities and/or locations of such viewers, as well as purchasing histories or preferences of such viewers), attributes of a context in which the customized resource identifier is to be provided, such as an environment in which the advertisement 160 is to be displayed, or on any other relevant factors. Based on such attributes or factors, and in accordance with the present disclosure, a customized resource identifier 150, viz., "mkt.shop/gridiron-grill," that is not only shorter than the original URL 140 and, therefore, more easily recalled by the customer 170, but also bears some relation to the network page 116 or the contents thereof, is generated. Subsequently, the customized resource identifier 150 may be provided in any relevant context or environment where one or more prospective users (e.g., the customer 170) of the network page 116 may be located, such as on the advertisement 160, and thereby increase the likelihood that the customer 170 will recall the customized resource identifier 150, and use the customized resource identifier 150 to access the network page 116, e.g., from a tablet computer 172, at a later time.

Some advantages of the systems and methods of the present disclosure, such as the system 100 shown in FIG. 1, may be apparent in contrast with the deficiencies of prior art systems, which may generate such identifiers at random or based on a string of one or more characters provided by a user. For example, if a resource identifier is generated for the URL 140 at random, the identifier will likely be shorter than the original URL from which it was generated, but may be equally difficult to remember and even more challenging to spell. Moreover, a randomized resource identifier will bear no apparent relation to either the network page 116, the customer 170, or any context in which the randomized resource identifier may be provided, e.g., on the advertisement 160. As a result, the shortening of the URL 140 prior art systems would not enhance (and may, in fact, diminish) the likelihood that the customer 170 will recall the randomized resource identifier, and use the randomized resource identifier to access the network page 116 from the tablet computer 172 at a later time. Likewise, if a resource identifier is generated for the URL 140 using one or more keywords provided by a user, the resource identifier might be easy to remember for the user who provided the keywords, but not for others, and will also bear no apparent relation to either the network page 116, the customer 170, or any context in which the randomized resource identifier may be provided.

Accordingly, some embodiments of the systems and methods of the present disclosure are directed to generating customized identifiers of network-based resources, such as pages or other information that are made available on the Internet or another network. The customized identifiers generated in accordance with the present disclosure may be shorter than a standard identifier of the network-based resource, and/or may include words or combinations of words that may bear some relation to the content of the network-based resource itself, to one or more prospective users of the network-based resource, and/or to a context in which the customized identifier is provided to such prospective users. Alternatively, the words selected for inclusion in the customized identifier may have some relationship with one another, but may bear no relation to the content of the network-based resource, the prospective users of the network-based resource, or any context in which the customized identifier may be provided at all, such as "bluesky" or "greentree." The words or combinations of words to be included in a customized identifier in accordance with the present disclosure may be selected and incorporated therein in any order and on any basis, such as the likelihood that one or more of the prospective users of the network-based resource who view the words or combinations of words included in the identifier is more likely to recall the identifier and access the network-based resource by way of the identifier at a later time.

Although the concept of what is now called the Internet dates to the 1950s and 1960s, most computer users were first exposed to the Internet following the establishment of the World Wide Web in the early 1990s. The World Wide Web, or "the Web," enabled users of any machine connected to the Internet to access content maintained on any other machine that is also connected to the Internet by way of an Internet Protocol address (or "IP address") expressed in a four-number decimal format, e.g., 123.45.67.89. Later, the Domain Name System (or "DNS") was implemented in order to map text-based identifiers (or "domain names") to four-number IP addresses. The DNS simplified the process for accessing network-based resources, as computer users frequently found the combinations of words or abbreviations expressed in a domain name or host name to be easier to remember than a four-number IP address. For example, a domain name typically includes a host name comprising a top-level domain, e.g., .com, .org, .gov or .edu, preceded by a second-level domain that may include any number of alphanumeric characters that is most commonly used as the primary identifier of the host name. For example, in the host name "www.uspto.gov," the top-level domain is ".gov" and the second-level domain is "uspto." Similarly, in the host name "www.washingtonpost.com," the top-level domain is ".com," and the second-level domain is "washingtonpost." The distribution of second-level domains and, more recently, top-level domains, is implemented under the control of ICANN.

A network-based resource may be formally identified and accessed by a computer device based on a resource identifier, such as a URL, which is used by one computer device to request content maintained by another computer device over a network. The architecture of a typical URL includes a number of standard elements, such as a scheme name or protocol, e.g., HTTP, followed by a host name referencing one or more domains, and a file path defined by a file name maintained in one or more folders or directories, which may be separated by one or more punctuation marks such as colons, slashes, underscores, dashes or periods (or "dots"). Thus, a user may provide the URL "http://www.copyright.gov/fedreg" to a computer application, such as a browser, in order to easily access files, viz., Federal Register Notices, that are hosted by the United States Copyright Office at the hostname "copyright.gov" and stored in the directory "fedreg." Because users may now easily access Internet-based files simply by learning and providing URLs to browsers or other applications, URLs are very commonly provided in digital and print advertisements that are presented to prospective customers in visible locations, or in any other conspicuous manner.

The ease with which files and information may be shared between computers or computer devices by way of the Web has allowed computer users to incorporate the powers of the Internet into nearly every aspect of their lives. Today, computer users may communicate with one another using a wide range of electronic messaging platforms, shop for items of any kind or form, obtain news and other timely information, watch televised programs, listen to audio files, obtain driving directions and up-to-the-minute traffic alerts, all over the Internet. Accordingly, it is estimated that there are nearly 300 million active domains having countless numbers of files, each of which may be accessed over the Internet using a unique URL.

Shortly after the World Wide Web became accepted by computer users and the general public, mobile devices such as cellular telephones and personal digital assistants (or "PDAs") began to include hardware components and software applications which enabled users of such devices to wirelessly access network-based resources, such as pages or files, over the Internet, simply by providing or activating a resource identifier (e.g., typing a URL into a browser, or clicking upon a hyperlink to the URL in a browser) to one or more applications operating on such devices. Now, many other devices or machines such as televisions, wristwatches, media players, automobiles or household appliances are now equipped to receive or send information to other devices or machines over the Internet.

The rapid and thorough propagation of Internet-based content and the evolution of miniaturized or wireless devices have revealed one or more unplanned limitations on the accessibility of information over the Internet, however. Because the most effective URLs are typically those that are short and easy to remember, such as "whitehouse.gov" or "navy.mil," such URLs have the highest value and are particularly rare. As a result, many URLs, particularly URLs that are linked to newly launched web sites or recently posted content, feature longer host names or domain names that may not resemble words or phrases at all. Further, as is discussed above, URLs also include file paths that may include any number of folders or directories, separated by various punctuation marks, and conclude with the name of a file. A URL that includes unique words or phrases, or which refers to different aspects of computer systems or computer language, e.g., the domain name and each of the folders, sub-folders or like references, and has an extended length, may be difficult for most users to accurately recall at a later time.

Therefore, users who wish to access a network-based resource having a lengthy or confusing permanent URL may experience difficulties or delays when entering the URL into an address box or address bar of a browser, or when typing the URL into a body of another document. Such difficulties may be particularly acute when using a mobile device such as a smartphone or tablet computer, which typically feature touchscreen-based keyboards and operate applications having address boxes or address bars of comparatively small sizes.

In order to overcome such difficulties, some computer-based applications may shorten the lengths of URLs either on a random basis, e.g., by including randomly selected combinations of alphanumeric characters, or by including combinations of such characters that are manually chosen by a user. For example, an identifier shortening service may be used to generate a randomized URL having a short host name and a brief file path created at random. When the randomized URL is entered into a browser or other application or selected by a user, the browser or other application is redirected to a URL of a comparatively longer length, which subsequently causes the browser or other application to access a network-based resource associated with the longer URL. Alternatively, an identifier shortening service may enable a user to manually select a string of characters to be included in a file path or file name of a shortened URL, and the selected characters may be appended to a short host name in order to generate the shortened URL.

While identifier shortening services may solve some problems associated with the use of permanent URLs which may be long or confusing, the use of such services may result in other, unrelated difficulties. For example, a randomly generated shortened URL may include combinations of characters that are difficult to recall or spell correctly. Likewise, although a shortened URL that includes characters selected by one user may be easy to recall and spell by that user, the shortened URL may be difficult to recall or spell by other users who may not have selected the same characters for inclusion in the shortened URL if given the opportunity to do so.

In either instance, shortened URLs that are randomly generated, or shortened URLs which include characters that are selected by a user, frequently bear little to no relation to either the content of the network-based resources with which they are linked, the prospective users or viewers of the network-based resource, or a context in which the shortened URLs are to be provided, and may be no more likely to be remembered and accurately entered into an address bar or other application by a user.

The systems and methods of the present disclosure are directed to generating customized identifiers for network-based resources, such as web pages, and associating the customized identifiers with the network-based resources. The identifiers may include file paths comprising words or combinations of words that are selected for the purpose of enhancing the likelihood that viewers of the customized identifiers, in any context, will recall and use the identifiers to access the network-based resources with which the identifiers are associated. For example, the words or combinations of words to be included in a customized identifier may be selected based at least in part on attributes of the network-based resource, e.g., characters, images or other information expressed in one or more web pages, or on attributes of one or more users who may be expected to encounter the customized identifiers, e.g., names, identities or locations of such users, as well as items that were previously purchased by such users, or items in which such users are known or believed to be interested. Alternatively, the words or combinations of words may be selected based on attributes of a given context in which the identifier is to be provided, or on any other relevant factor, including the relation of the respective words to one another, or any appropriate measure of their applicability or relevance for a particular purpose.

In this regard, the systems and methods disclosed herein may effectively alleviate the difficulties or confusion ordinarily encountered by users who attempt to access a network-based resource using an identifier, such as a URL, or pique the interest in a network-based resource in users who encounter the customized identifier in any context. Once a customized identifier is generated in accordance with the present disclosure, the customized identifier may be associated with the network-based resource and presented to users in a variety of formats, including in digital or print materials, on billboards or signs, on shipping labels or anywhere else that an advertisement may be provided.

A word or combination of words may be selected from a set or a bank of words for inclusion in a customized identifier, such as a URL, based on a relation of the words or the combination of words to the content of the network-based resource with which the customized identifier is to be provided, or to one or more users who may be expected to encounter the customized identifier. For example, a customized identifier including a file path of "rakeman" or "shovelguy" may be generated for a web site including advice for gardeners, while a customized identifier including a file path of "hammerhero" or "castlemaker" may be generated for a web site including information on home improvement projects. Moreover, a customized identifier having a file path which includes words such as "runway," "jet" or "delay" may be generated for a web site and provided in an advertisement posted at an airport, along with one or more other words relating to the content of the web site, the location of the airport or any other relevant factor. Also, the combinations of words provided in file paths of customized identifiers generated in accordance with the present disclosure may be selected or ordered based on their respective parts of speech. For example, the words of the combination may be arranged in pairs of adjectives and nouns, verbs and nouns, adverbs and verbs, nouns and other nouns, or in any other combination that may enhance the memorability of the file path in the mind of a viewer thereof.

Additionally, the words to be included in a file path of a customized identifier may be selected from a set or bank of words merely on the basis of their relationship or relevance to one another, or their linguistic compatibility with one another, where the relation between the words increases their relative memorability or a relative likelihood that the words will evoke a positive response from one or more viewers. For example, a customized identifier may include combinations of consonant words such as "think tank," combinations of alliterative words such as "Red River ride," or combinations of assonant words such as "flip his lid." Where a customized identifier is generated based on the relationship of words to one another, the words need not have any relationship to the attributes of the network-based resource with which the customized identifier is to be associated, or the prospective viewers who may encounter the customized identifier, as long as the words or the combination of the words are more likely to cause a viewer to access the network-based resource after viewing the customized identifier. The words or combinations of words to be used in a file path of a customized identifier may also be selected based on extrinsic criteria including a level of humor associated therewith, or a relation to one or more ongoing current events.

The words to be included in a file path of a customized identifier may further be selected from a set or a bank of words based on their previously observed effectiveness in referring to network-based resources, which may be based on a number of times users accessed the network-based resources by way of the customized identifiers including such words, or an aggregate measure of activity following the access to such resources (e.g., a number of purchases executed from a network-based resource, or an aggregate value of the purchases executed from the network-based resource, by customers who accessed the network-based resource using the customized identifier). For example, where the words "maple" or "syrup" have been determined to be effective when included in file paths of customized identifiers presented to prospective viewers in Vermont, the words "maple" or "syrup" may be reliably included in other customized identifiers presented to other prospective viewers in Vermont in the future. Likewise, where the words "teeny" or "bopper" have been determined to be ineffective when used in file paths of customized identifiers presented to users of ages twelve (12) to twenty (20), the words "teeny" or "bopper" may be excluded from customized identifiers of any network-based resources provided to teenagers or young adults in the future.

When there are no words that have been successfully incorporated into customized identifiers of a given network-based resource in the past, however, words or combinations of words may be selected for inclusion in a file path of a network-based resource based on a measure of their relevance to attributes of the network-based resource, of the prospective viewers, or attributes of a context in which the customized identifier is to be provided (e.g., on a shipping label, adhesive tape or other adhesive layer affixed to a package to be delivered to a customer, on a billboard alongside a highway, or in an electronic mail or print advertisement). Alternatively, an effective word or combination of words may be identified through a trial process by which two or more customized identifiers that are associated with the same network-based resource may be presented to prospective viewers, and the word or combination of words of the most effective customized identifier may be selected for presentation in the future.

A set or a bank of words may also be filtered or otherwise edited in order to avoid using profane, offensive, insensitive or inappropriate words in a customized identifier. Words may be filtered on any relevant basis, including an objective basis (e.g., where the use of the words in a customized identifier would be offensive to all or most people), or a subjective basis (e.g., where the use of the words would be offensive to prospective or expected viewers of the customized identifier). For example, in accordance with the present disclosure, racial, ethnic or religious slurs would likely not be appropriate for use in any customized identifier, regardless of the person or persons who may be expected to view the customized identifier, while file paths with combinations of words including "hurricane" or "earthquake" may not be appropriate for residents of the Gulf Coast region of the United States or California, respectively, which have been struck by powerful hurricanes or earthquakes, respectively, in recent times.

Further, words or combinations of words may also be filtered against a list of known trademarks or trade names, in order to minimize the risk that the use of the words or combinations in a customized identifier may subject an owner or an operator of the network-based resource to liability for trademark infringement. Conversely, the list of the trademarks or trade names may also be consulted in order to identify one or more of such marks or names that may serve as a basis for generating a customized identifier as a parody. For example, while the use of the words "Mickey" and "Mouse" in a customized identifier may risk infringing one or more trademarks of The Walt Disney Company, a file path including words such as "trickymouse" or "mickeyblouse" may be a parody of such marks, and may be successfully incorporated into a short and easy-to-remember customized identifier on this basis.

Figure 2:
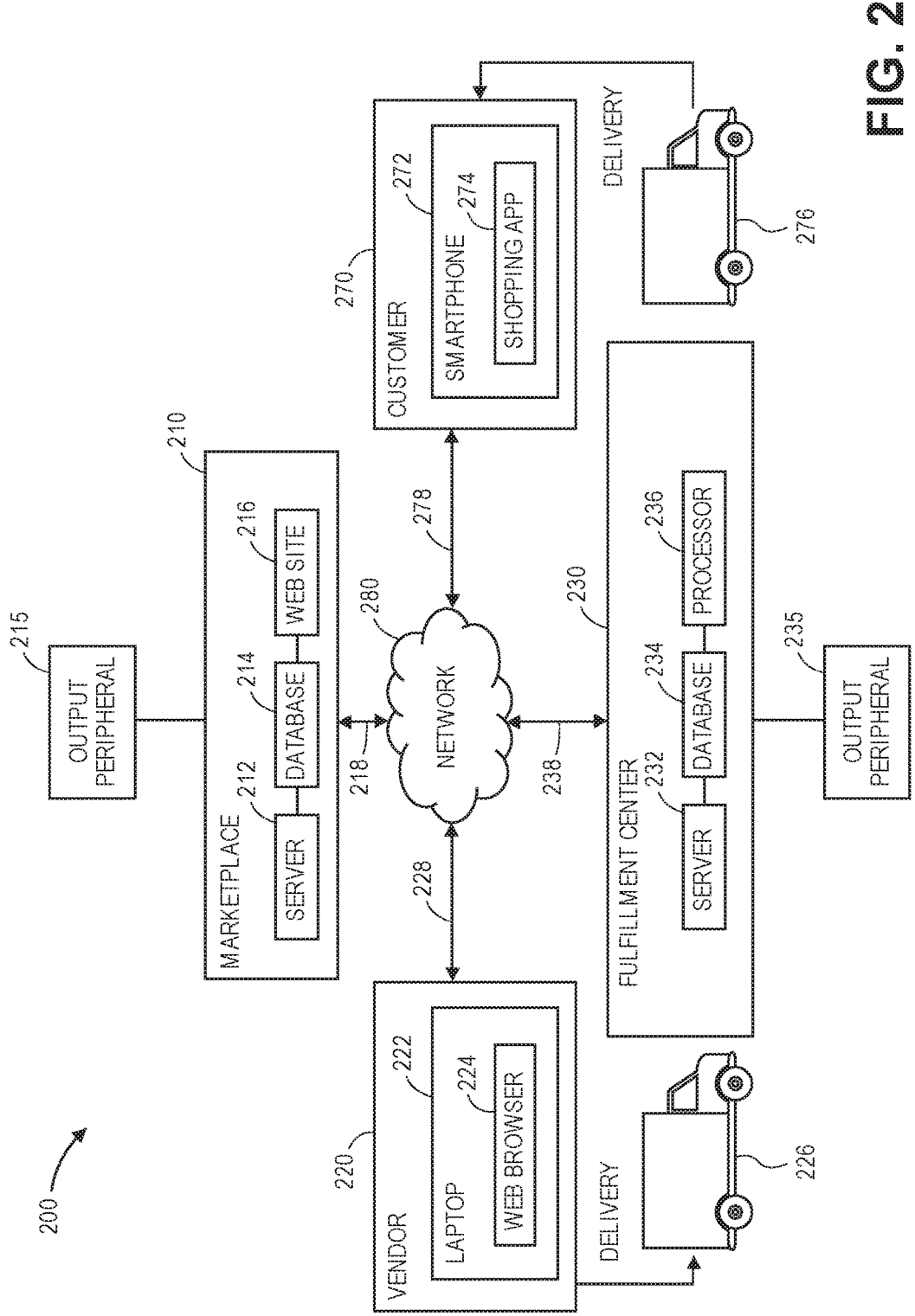
FIG. 2 is a block diagram of components of one system for generating customized resource identifiers in accordance with embodiments of the present disclosure.

Referring to FIG. 2, a block diagram of components of one system 200 for generating customized resource identifiers in accordance with embodiments of the present disclosure is shown. Except where otherwise noted, reference numerals preceded by the number "2" in FIG. 2 indicate components or features that are similar to components or features having reference numerals preceded by the number "1" in FIG. 1. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and databases (or other data stores) 214 for hosting a web site 216. The databases 214 may be configured to store any type or form of relevant information, including but not limited to a set or a bank of relevant words and/or combinations of words, as well as information regarding the definitions of such words or combinations, the pronunciations and/or categories or contexts in which such words or combinations may be used. Additionally, the databases may further be configured to store information or data regarding the relevance or relationship of such words or combinations to one another, as well as to attributes of network-based resources (e.g., one or more of the web pages of the web site 216), attributes of prospective users of such resources (e.g., the customer 270) or any context in which the words or combinations may be presented to the prospective users (e.g., on one or more outputs generated by the output peripherals 215, 235), or any other relevant factors.

The marketplace 210 may also include one or more output peripherals 215, which may comprise any component that is configured to display or provide information in any manner, including but not limited to a customized resource identifier generated in accordance with the present disclosure, to one or more prospective viewers. The output peripheral 215 may be configured to generate one or more physical or virtual outputs, such as one or more display apparatuses (e.g., a computer display), printing apparatuses (e.g., for printing information on paper of standard sizes, or on paper, labels, signs or any other materials of any sizes, such as shipping labels, billboards, paperboard signs or the like), audio apparatuses (e.g., speakers) or any other device for generating any form of output. Additionally, other output peripherals (not shown) may be utilized in other locations, without any association with the marketplace 210, and may be used to present a customized resource identifier to one or more prospective viewers.

The marketplace 210 may be physically or virtually associated with one or more storage or distribution facilities, such as the fulfillment center 230. The web site 216 may be implemented using the one or more servers 212, which connect or otherwise communicate with the one or more databases 214 as well as the network 280, as indicated by line 218, through the sending and receiving of digital data. Moreover, the database 214 may include any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations, storage areas and distribution stations. The fulfillment center 230 further includes an output peripheral 235 which, like the output peripheral 215 of the marketplace 210, may comprise any component that is configured to display or provide information in any manner, such as one or more display apparatuses (e.g., a computer display), printing apparatuses (e.g., for printing information on paper of standard sizes, or on paper, labels, signs or any other materials of any sizes, such as shipping labels, billboards, paperboard signs or the like) or any other device for generating any form of output.

The fulfillment center 230 may also include one or more workers (not shown), such as any designated personnel tasked with performing one or more tasks within the fulfillment center 230. Such workers may handle or transport items (e.g., any type or form of good, product, media or other tangible consumer article) within the fulfillment center 230, or operate one or more pieces of equipment therein (not shown). The workers may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, printers, touchscreens or like devices.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with the workers, or the various storage facilities and other components of the fulfillment center 230. Such control systems may also be associated with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of resource identifiers that are generated in a customized manner using words or combinations of words selected based on their relationships with attributes of the resources with which they are associated, attributes of one or more viewers who may be expected to encounter the identifiers, attributes of a context in which the identifiers may be provided, as well as their relationships with one another, or their previously observed effectiveness as elements of a file path of a customized resource identifier, the systems and methods of the present disclosure are not so limited. Rather, the systems and methods disclosed herein may be utilized to generate customized resource identifiers using words or combinations of words of any length that are selected on any basis, where the customized resource identifiers may be deemed more likely to be remembered by one or more viewers thereof, and used to access the network-based resources with which they are associated.

Figure 3:
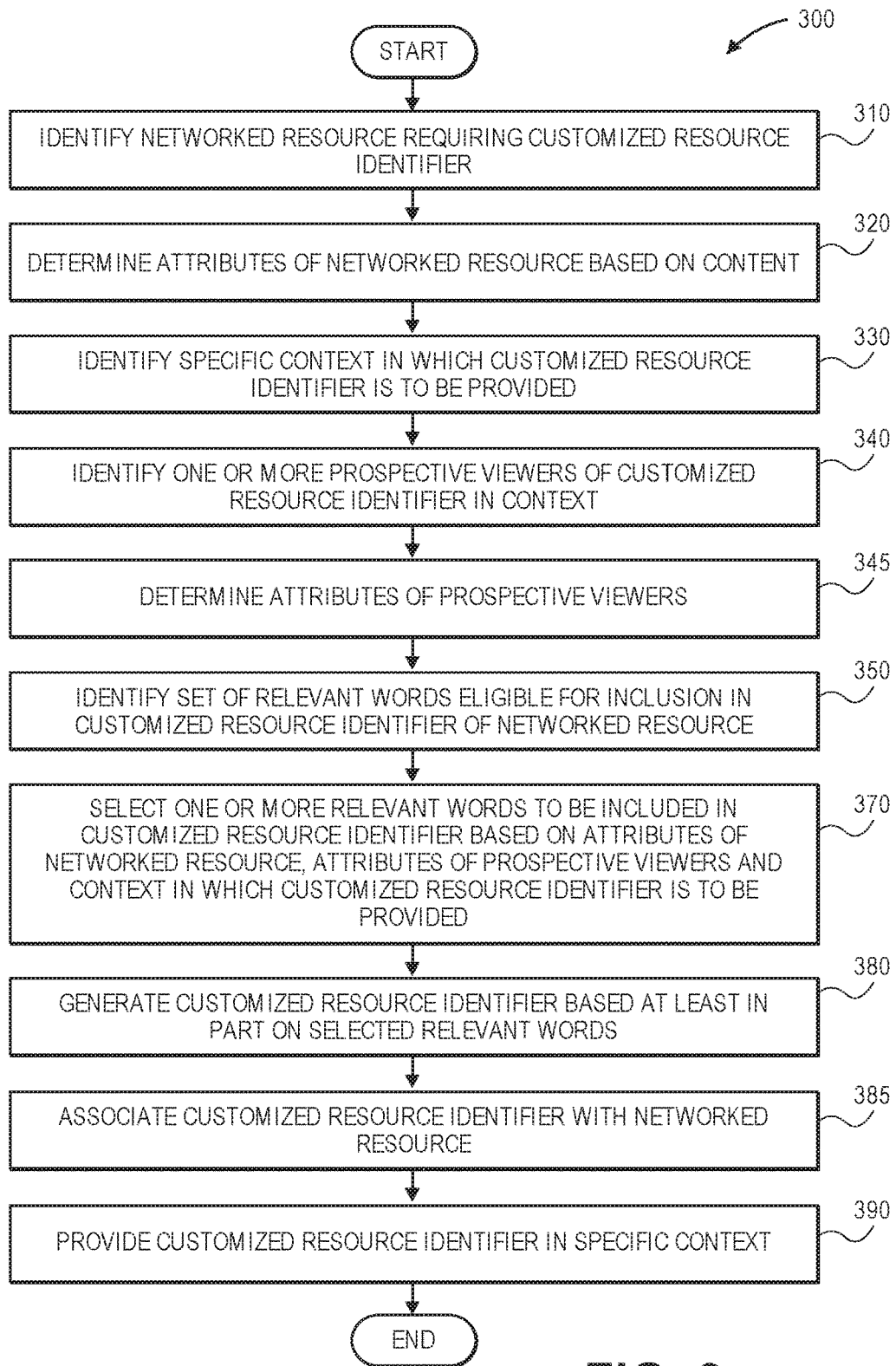
FIG. 3 is a flow chart of one process for generating customized resource identifiers in accordance with embodiments of the present disclosure.

Referring to FIG. 3, a flow chart 300 representing one embodiment of a process for generating customized resource identifiers in accordance with embodiments of the present disclosure is shown. At box 310, a networked resource requiring a customized resource identifier may be identified. The networked resource may be any type or form of web page, document, multimedia file or any other type of file maintained by a host and accessible over a network, such as the Internet. Additionally, the networked resource may be identified as requiring a customized resource identifier on any basis. For example, where a web page includes a URL that is particularly long or includes a number of confusing or unmemorable terms or elements, and where a link to the web page is intended to be printed in an advertisement, spoken in one or more audio signals, or sent via an electronic message of limited length (e.g., an SMS message, an MMS message or a microblog posting), a customized resource identifier for the web page may be desired.

At box 320, one or more attributes of the networked resource are determined based on its content. For example, source code associated with the networked resource may be mined to identify alphanumeric characters and/or images to be rendered on the web page, metadata associated with the networked resource, hyperlinks to other networked resources, or any other information or data associated with the networked resource. As another example, information regarding the popularity of the networked resource, e.g., demographics of people who find the content of the networked resource to be particularly popular or unpopular, such as geographic regions where or times of the year when the networked resource is deemed popular or unpopular, may also be identified.

At box 330, a specific context in which the customized resource identifier is to be provided is identified. For example, the customized resource identifier may be intended to be shown in a commercial during a television program, spoken in a radio advertisement, printed on a sign, or presented in any other relevant manner. At box 340, one or more prospective viewers of the customized resource identifier may be identified, and at box 345, attributes of the one or more prospective viewers are determined. For example, where the customized resource identifier will be shown in a commercial during a televised college football game or a situation comedy (or "sit-com"), it may be expected that the customized resource identifier will be viewed by those with at least some affinity for college football, or fans of the sit-com. Similarly, where the customized resource identifier will be printed on a billboard provided at a given intersection, it may be expected that the customized resource identifier will be viewed by workers or residents in a vicinity of the given intersection.

At box 350, a set of relevant words that are eligible for inclusion in a customized resource identifier of the networked resource is identified. The set may include a master list or group of all available words, or a subset or limited group of such words that may be narrowed or filtered on any basis. For example, the set may be a standardized bank of words, such as a general dictionary that may be available in an electronic format, or a bank of words that is created and specifically provided for the purpose of identifying words or combinations thereof to be included in customized resource identifiers, and may include any relevant information or data regarding the applicability of such words for use in customized resource identifiers (e.g., metadata or statistical information).

At box 370, one or more of the relevant words is selected based on the attributes of the networked resource, the attributes of the prospective viewers or the attributes of the context in which the customized resource identifier is to be provided. For example, where the networked resource is a web site including information regarding hotels in Florida, and the customized resource identifier is intended to be provided in a microblog posting in the late fall or early winter, words relating to sunshine, warm weather or citrus fruits may be identified based on the content of the web site (e.g., content pertaining to Florida), words relating to cold weather regions or snow may be identified based on the prospective viewers who may be expected to encounter the customized resource identifier (e.g., those who may be interested in traveling to Florida), and words relating to holidays or events during the time of year may be identified based on the context in which the customized resource identifier is to be provided (e.g., a microblog posting during cold weather months). Alternatively, one or more of the words may be identified based on a relationship to one or more of the other words, or based on the previously observed effectiveness of the words when included in other resource identifiers, or on any other relevant factor.

At box 380, a customized resource identifier is generated based at least in part on the selected relevant words, and at box 385, the customized resource identifier is associated with the networked resource. For example, a URL including a file path such as "snowbunny" or "blizzardbeater" may be generated for a web page that includes information regarding hotels in Florida and is intended to be provided to prospective customers in winter months. Once the URL has been generated, the URL may be affiliated with the web page directly, or linked to the permanent URL associated with the web page. At box 390, the customized resource identifier is provided in the specific context identified at box 330, e.g., in a document, in a video commercial or on a billboard, and the process ends.

Accordingly, the systems and methods of the present disclosure may generate a customized resource identifier, such as a URL, for a network-based resource that includes words or combinations of words selected based on one or more attributes of the network-based resource, of the persons who may be expected to encounter the customized resource identifier, and of the context in which the customized resource identifier is to be provided (e.g., a printed mailing circular, a placard posted in a subway station or shopping mall, a digital or printed advertisement placed on a billboard, or an audible statement in a radio advertisement or podcast). The customized resource identifier may be designed to increase its memorability among those who encounter it, and is preferably shorter and/or more easily spelled than a resource identifier that may be permanently associated with the network-based resource for this reason. The customized resource identifier may therefore increase the likelihood that a viewer thereof may recall and correctly spell the customized resource identifier at a later time when attempting to access the network-based resource.

As is discussed above, the words or combinations of words included in a customized resource identifier of a network-based resource generated in accordance with the present disclosure, e.g., a shortened URL associated with a web page, may be selected based on any relevant information or data regarding the network-based resource, prospective viewers of the network-based resource, or an intended context in which the customized resource identifier is to be provided, or on any other relevant factor. Moreover, the use of specific words or combinations of words in customized resource identifiers may be preferentially boosted or downgraded based on their particular relevance to the network-based resource, the prospective viewers or the intended context, their previously observed effectiveness when included in customized resource identifiers provided to specific users or in particular contexts, or on any other relevant factor.

Referring to FIG. 4, a set of data for consideration by one system for generating customized resource identifiers in accordance with embodiments of the present disclosure is shown. The set of data includes a table 400 of information regarding a plurality of entries 440 that is sorted by columns identifying the words 410, one or more definitions 412 of the words, parts of speech 414 of the words 410 and categories 416 of the words 410. Additionally, the table 400 further includes columns corresponding to preferences 420 for the use of the words 410 in customized resource identifiers, e.g., based on ages 422 and geographic locations 424 of prospective viewers of the customized resource identifiers, and restrictions 430 on the effectiveness of the words, also sorted by ages 432 and geographic locations 434 of the prospective viewers.

As is discussed above, words or combinations of words may be selected for inclusion in customized resource identifiers, e.g., in file paths of URLs, on any basis, including whether or not the words or combinations of words may be effectively utilized in customized resource identifiers provided to members of certain demographics. For example, as is shown in FIG. 4, the word "grind" is listed in the table 400 as having two definitions, viz., "to reduce to fine particles," and "to engage in the performance of a difficult task." Accordingly, the table 400 indicates that the word "grind" has been effectively utilized in customized resource identifiers presented to prospective viewers in ages twenty-five to forty in the Seattle and Portland areas according to the first definition of "grind" listed in the table 400, based at least in part on the popularity of coffee (e.g., a beverage brewed from ground coffee beans) among viewers of such ages in these geographic reasons. Likewise, and for different reasons, the table 400 indicates that the word "grind" has been effectively utilized in customized resource identifiers presented to prospective viewers of ages fifteen to twenty-five in all geographic regions, and less effectively utilized in customized resource identifiers presented to prospective viewers of ages thirty-five to eighty, according to the second definition of "grind" listed in the table 400, which has been recently adopted by youths.

The table 400 identifies other preferences for use or restrictions on effectiveness of certain of the entries 440 listed therein. For example, the table 400 indicates that the word "mad" may be effectively included in customized resource identifiers associated with a definition of "angry, upset, maniacal" that are provided to prospective viewers of ages thirty-five to eighty, but not to prospective viewers of ages fifteen to twenty-five. Conversely, the table 400 also indicates that the word "mad" may be effectively included in customized resource identifiers associated with a slang definition of "to a more extreme extent" or "very" that are presented to younger users, who frequently use the word "mad" in this manner, but not to older users, who are unlikely to use the word "mad" in this manner.

In accordance with the present disclosure, words or combinations of words may be selected based on extrinsic factors that may be unrelated to any apparent or commonly accepted definition of such words or combinations, as well. For example, the use of the word "sock" is shown in the table 400 as preferred when included in customized resource identifiers provided to prospective viewers of all ages in the Boston area, but disfavored when included in such identifiers provided to prospective viewers of all ages in the New York area, despite its innocuous general definitions, based on an association with the Boston Red Sox, a baseball team that is popular in Boston and unpopular in New York. Likewise, the word "husky" is listed in the table 400 as generally effective when included in customized resource identifiers presented to prospective viewers of all ages and across most geographic regions, with the localized exceptions of the states of North Carolina and Kentucky, where some college basketball teams have been persistently unable to defeat other teams named "Huskies" in championship play.

Figure 5A:
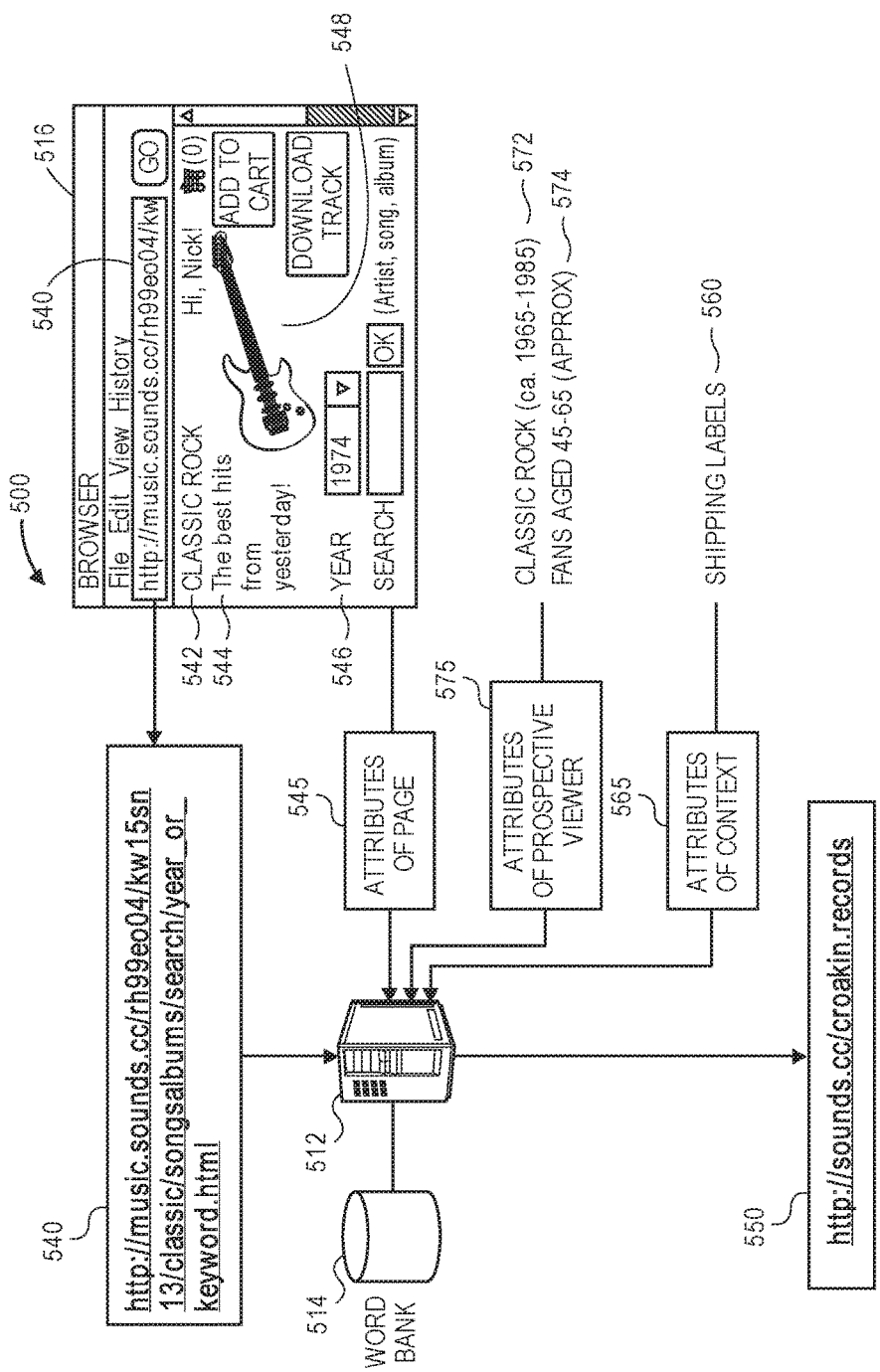
FIG. 5A is a flow diagram of one system for generating customized resource identifiers in accordance with embodiments of the present disclosure.
Figure 5B:
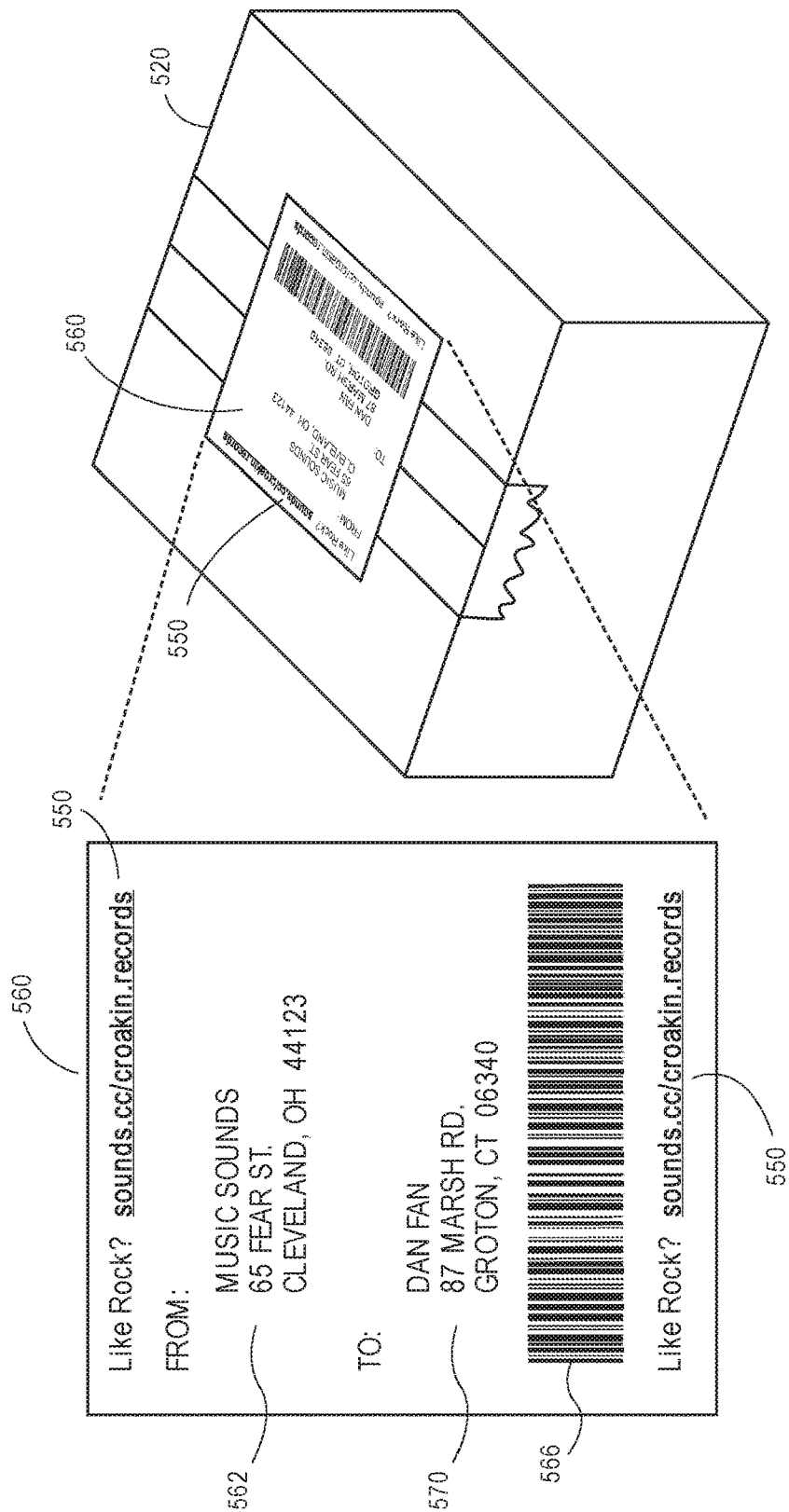
FIG. 5B is a view of one context for presenting a customized resource identifier generated in accordance with embodiments of the present disclosure.

Once words or combinations of words have been identified and selected for inclusion in a customized resource identifier, e.g., in a file path of a shortened URL of a web page, the customized resource identifier may be provided in any context. Referring to FIGS. 5A and 5B, a flow diagram of one system 500 for generating customized resource identifiers in accordance with embodiments of the present disclosure, and a view of one context 560 in which such customized resource identifiers may be presented to prospective viewers, are shown. Except where otherwise noted, reference numerals preceded by the number "5" in FIGS. 5A and 5B indicate components or features that are similar to components or features having reference numerals preceded by the number "2" in FIG. 2, or by the number "1" in FIG. 1, respectively.

As is shown in FIG. 5A, the system 500 includes a server 512, a data store 514 and a web page 516 having a substantially lengthy permanent URL 540. The data store 514 includes a bank of words, and the web page 516 includes a title or header 542 (viz., Classic Rock), a description 544, interactive features 546 and an image 548. The server 512 is configured to identify or receive attributes 545 of the web page 516, attributes 575 of prospective viewers, and attributes 565 of a context 560 in which the customized resource identifier is to be provided (e.g., wherein the customized resource identifier is to be provided on a shipping label or onto an adhesive layer, the attributes may relate to a parcel to which the shipping label or adhesive layer is to be affixed, contents of the parcel, a sender of the parcel, a recipient of the parcel, or a time or date on which the parcel was ordered for purchase).

Based at least in part on one or more of the attributes 545, 565, 575, the server 512 is further configured to generate a customized resource identifier 550 for the web page 516 that incorporates one or more of the words in the word bank 514, e.g., in a file path of a shortened domain name and file path associated with the web page 516, "sounds.cc/croakin.records." The combination of the contraction "croakin," e.g., a contraction of "croaking," and the word "record," which are listed in the table 400 of FIG. 4, that is selected for inclusion in the customized resource identifier rhyme with the idiom "broken record," which refers to a sound that is repeated over and over. Moreover, the contraction "croakin'" relates to one of the definitions of "croak" listed in the table 400, e.g., to perish, which at least tangentially refers to attributes 575 of prospective viewers of the customized resource identifier 550, i.e., fans of classic rock who are typically between forty-five and sixty-five years of age.

Once the customized resource identifier 550 has been generated, the customized resource identifier 550 may be provided in any relevant context to one or more prospective viewers. Referring to FIG. 5B, a shipping label 560 to be applied to a package 520 in accordance with the present disclosure is shown. The shipping label 560 identifies a sender 562 of the package 520 and a customer 570 who is intended to receive it, and further includes a bar code 566. Additionally, as is shown in FIG. 5B, the shipping label 560 is also adorned with the customized resource identifier 550. Therefore, when the customer 570 receives the package 520, the customer 570 will likely view the customized resource identifier 550 upon the shipping label 560. Thus, the customer 570 may be deemed more likely to remember and correctly spell the customized resource identifier 550 in the future than if the shipping label 560 had included the permanent URL 540 which, in any event, would not likely fit on the shipping label 560.

As is also discussed above, where one or more words in a word bank or combinations of such words have been previously determined to be sufficiently effective when included in customized resource identifiers, particularly in file paths of shortened URLs, such words or combinations may be selected for inclusion in other customized resource identifiers in the future. If no such words or combinations were previously determined to be sufficiently effective, then words or combinations of words may be selected based on their relation to one or more attributes of a network-based resource, of prospective viewers of the customized resource identifier, or of a context in which the customized resource identifier is to be provided. Additionally, where a word or combination of words is selected for inclusion in a customized resource identifier, the word or combination may be checked against a restricted list of words or combinations in order to ensure that the use of the word or combination would not infringe any rights in such words or otherwise appear to be offensive or insensitive in the eyes of one or more of the prospective viewers.

Figure 6:
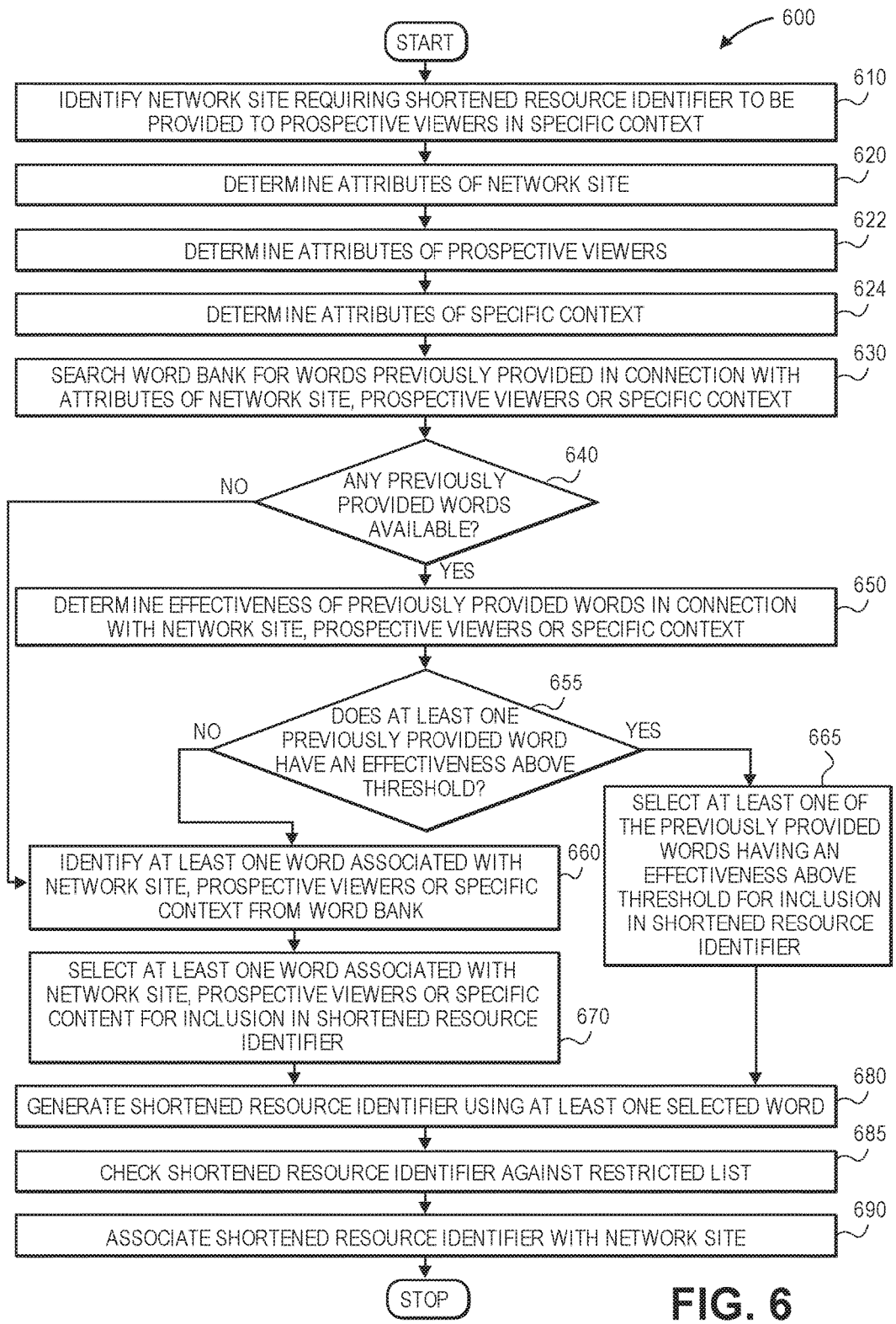
FIG. 6 is a flow chart of one process for generating customized resource identifiers in accordance with embodiments of the present disclosure.

Referring to FIG. 6, a flow chart 600 representing one embodiment of a process for generating customized resource identifiers in accordance with embodiments of the present disclosure is shown. At box 610, a network site requiring a shortened resource identifier to be provided to prospective viewers in a specific context is identified. The network site may be any type or form of page or other site that is maintained on a network and made available to users of computer devices over a network, such as the Internet. At box 620, attributes of the network site are determined. Such attributes may relate to any aspect of the content of the network site, including but not limited to the alphanumeric characters, fonts, images, interactive features, layout or purpose of the network site, or on any other factor pertaining to the network site.

At box 622, the attributes of the prospective viewers of the shortened resource identifier are identified, and at box 624, the attributes of the specific context in which the shortened resource identifier is to be provided are identified. The attributes of the prospective viewers may relate to any relevant demographic information, data or facts associated with such viewers (e.g., information regarding items traditionally purchased by such viewers), while the attributes of the specific context may relate to any pertinent details concerning the location, time, manner or format in which the shortened resource identifier is to be presented to the prospective viewers.

At box 630, a word bank is searched for words that were previously provided in connection with attributes of the network site, the prospective viewers or the specific context. According to some embodiments, words or phrases that were previously included in shortened resource identifiers referring to the network site identified at box 610, or similar sites, may be considered for inclusion in the shortened resource identifier. At box 640, it is determined whether any previously provided words are available. For example, where the network site is a web site pertaining to pets such as dogs, and the word or phrase "mansBFF," e.g., man's "best friend forever," was effectively used in shortened resource identifiers for the network site, or for other pet-related network sites, the word or phrase "mansBFF" may be considered for inclusion in the shortened resource identifier for the network site in the future. Likewise, words that were previously included in shortened resource identifiers presented to the prospective viewers, or similar viewers, or in shortened resource identifiers presented in the specific context, or in similar contexts, may also be considered for inclusion in the shortened resource identifier. For example, where shortened resource identifiers including the word or phrase "showme" were previously provided to residents of Missouri, or shortened resource identifiers including the word or phrase "fastlane" were previously provided on billboards adjacent to highways, such words or phrases may be considered for inclusion in a shortened resource identifier to be presented to Missouri residents or on a highway billboard, respectively.

If words that were previously provided in shortened resource identifiers relating to the attributes of the network site, the prospective viewers or the specific context are available, then the process advances to box 650, where the effectiveness of the use of such words in connection with the network site, the prospective viewers or the specific context is determined. If, at box 655, the effectiveness of at least one of the previously provided words exceeds a predetermined threshold, then the process advances to box 665, where at least one of the previously provided words is selected for inclusion in the shortened resource identifier.

If no words were previously provided in shortened resource identifiers relating to the attributes of the network site, the prospective viewers or the specific context, or if the words that were previously provided in connection with the network site, the prospective viewers or the specific context were not effective, then the process advances to box 660, where one or more words associated with the network site, the prospective viewers or the specific context is identified, and to box 670, where at least one of the words is selected for inclusion in the shortened resource identifier of the network site. For example, the words may be identified in the word bank based on any correlation between the content of the network site, characteristics of the prospective viewers or the specific context and such words, and one or more of the words having the strongest degrees of correlations may be selected for inclusion.

At box 680, a shortened resource identifier of the network site is generated using the at least one selected word. For example, the shortened resource identifier may be a URL having the same domain name or host name as a URL that is permanently associated with the network site, but with a shorter and/or more memorable file path that includes the selected words, e.g., one or more of the previously provided words having an effectiveness above a predetermined threshold, or one or more of the words having the strongest degree of correlation with the network site, the characteristics of the prospective viewers or the specific context.

At box 685, the shortened resource identifier is checked against a restricted list, which may include words, combinations of words or resource identifiers that have been deemed inappropriate. For example, the words or combinations of words to be included in the resource identifier may include or embody some or all of a trademark or service mark that is owned or in use by one or more other entities, or may be deemed subjectively offensive to one or more prospective viewers (e.g., inappropriate for viewing by a small number of viewers, or viewers in a particular, localized geographic region), or objectively offensive to some or all prospective viewers (e.g., inappropriate for viewing by even one such viewer). Comparing the shortened resource identifier to a restricted list may, therefore, avoid or reduce the risks of trademark infringement or offending one or more viewers. If the shortened resource identifier is not included on the restricted list, the process advances to box 690, where the shortened resource identifier is associated with the network site. For example, a shortened URL may be configured to redirect a user who enters the shortened URL into a browser or other application, or selects a hyperlink to the shortened URL, to activate a longer, permanent URL associated with the network site, or may be provided as a temporary substitute for the permanent URL.

As is discussed above, the words or combinations of words to be included in a customized resource identifier for a network-based resource, such as a web page, may be selected based on their effectiveness when previously used in identifiers of the network-based resource, or of similar network-based resources, as well as their effectiveness when included in customized resource identifiers that are associated with other network-based resources that were previously presented to the same set of prospective viewers or to a similarly situated set of prospective viewers, or their effectiveness when included in customized resource identifiers that were presented in the same context or in a similar context. If no such words or combinations were previously used, or if the words or combinations that were used were not sufficiently effective, then the systems and methods of the present disclosure may select words or combinations of words for inclusion in a customized resource identifier based on their relation to the network-based resource, the prospective viewers of the customized resource identifier, or the context in which the customized resource identifier will be presented to the prospective viewers.

Referring to FIG. 7, a set 700 of data for consideration by one system for generating customized resource identifiers in accordance with embodiments of the present disclosure is shown. The set 700 includes information 710 regarding a network site 712 for which a customized resource identifier is desired, as well as prospective viewers 714 of the customized resource identifier (e.g., males aged twenty to forty-five) and a context 716 in which the customized resource identifier is to be provided (viz., on billboards or street signs), The set 700 further includes a table 720 of information regarding combinations 722 of words and measures 724 of their observed effectiveness, and a table 730 of words 732 and measures 734 of their relation to a network site, prospective viewers or a context in which the words are to be provided.

As is shown in FIG. 7, the network site is directed to providing information regarding motorcycle spare parts and accessories typically to males of ages twenty to forty-five, and a customized resource identifier is desired for display on a billboard or street sign. The most effective of the combinations 722 of words in the table 720 is "tail-gunner," with an observed effectiveness of 0.93, followed by "land-chopper" and "laughing-gas," each having an observed effectiveness of 0.92 and 0.88, respectively. The table 720 further includes combinations 722 of words such as "gone-fishtailing," "coupon-clipper," "busted-grape," "baby-throttle," "belly-shover," "century-club" and "twisted-wick," each having an observed effectiveness ranging from 0.49 to 0.81. Therefore, according to some embodiments of the present disclosure, when a customized resource identifier is desired for the network site 712, the systems and methods of the present disclosure may select one or more of the combinations 722 of words having an observed effectiveness 724 above a predetermined threshold for inclusion in the customized resource identifier. The selection of the combinations 722 may be based strictly on their observed effectiveness 724 alone, e.g., such that "busted-grape" would be selected over "baby-throttle" but not over "coupon-clipper," or on their observed effectiveness 724 when considered in combination with one or more other relevant factors, such as whether a given word combination 722 has been used in a customized resource identifier recently, or a frequency with which the given word combination 722 is used.

Where none of the combinations 722 of words has an observed effectiveness 724 above the predetermined threshold, however, the systems and methods of the present disclosure may select one or more of words for inclusion in a customized resource identifier based at least in part on the relationship of the words to the attributes of the network site, the prospective viewers of the customized resource identifier, or the context in which the customized resource identifier is to be provided. For example, as is shown in FIG. 7, the words 732 "bike," "helmet" and "speed" have a particularly strong relation to the network site 712, the prospective viewers 714 or the context 716, with relationships 734 of 1.00, 0.98 and 0.95, respectively. Other words 732 such as "rocket," "warrior," "two-wheeler," "adult," "opportunity," "grown up" and "balance" have less strong relationships with the network site 712, the prospective viewers 714 or the context 716, ranging from 0.26 to 0.82. One or more of the words 732 may be selected based on the measure of the relationship with the network site, the prospective viewers or the context alone, or in combination with one or more other relevant factors, including but not limited to a recency or frequency with which the words 732 are used in customized resource identifiers.

Additionally, where no word or combination of words is clearly distinguished as an obvious choice for inclusion in a customized resource identifier of a network-based resource, or where two or more words or combinations of words may be utilized in customized resource identifiers of the network-based resource on a temporary basis, and the effectiveness of each customized resource identifier may be evaluated, until a most effective customized resource identifier is identified and designated as a customized resource identifier for the network-based resource.

Figure 8:
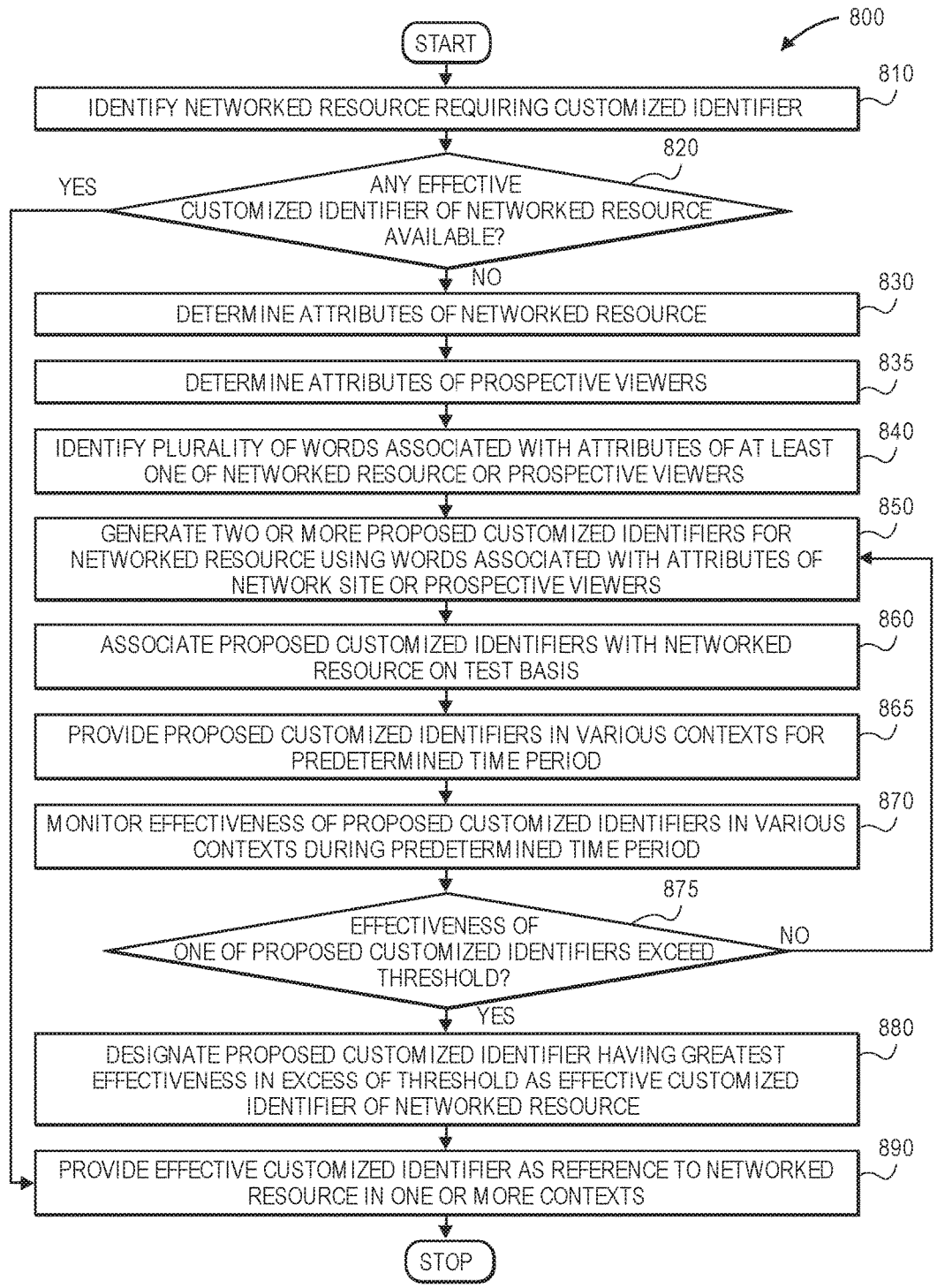
FIG. 8 is a flow chart of one process for generating customized resource identifiers in accordance with embodiments of the present disclosure.

Referring to FIG. 8, a flow chart 800 representing one embodiment of a process for generating customized resource identifiers in accordance with embodiments of the present disclosure is shown. At box 810, a networked resource requiring a customized identifier is identified. The networked resource may be any computer-based file or files (e.g. web pages, multimedia files, documents or the like) that may be accessed by other computers over a network. At box 820, whether any customized identifiers of the networked resource that have been previously identified as effective are available is determined. For example, if a customized identifier was previously utilized to refer to the networked resource, or to a similar networked resource, with a sufficient degree of success, or if a customized identifier is known to be effective when provided to a certain audience or presented in a certain context, the customized identifier may potentially be deemed effective for the networked resource. If any effective customized identifiers are available, then process advances to box 890, where one of the effective customized identifiers is provided as a reference to the networked resource in one or more contexts.

If no customized identifiers that have been identified as effective are available for the networked resource, then the process advances to box 830, where attributes of the networked resource are identified, and to box 835, where attributes of prospective viewers of the customized identifier are identified. For example, the networked resource may be a web site or web page associated with an online marketplace, a fantasy football league or a social network, and the prospective viewers of the web page may include customers of the online marketplace, participants in the fantasy football league or members of the social network.

At box 840, a plurality of words associated with the attributes of the networked resource and/or the prospective viewers are identified, and at box 850, two or more proposed customized identifiers for the networked resource are generated using the words. For example, the words may relate to the content of the networked resource or to one or more categories or types of prospective viewers, and the words may be provided alone or in combination with one another in one or more proposed file paths which may be appended to a host path or domain name associated with the networked resource.

At box 860, the proposed customized identifiers are associated with the networked resource on a test basis, e.g., configured to request the networked resource upon entry into an address bar of a browser or other like application by a user, or after being selected by the user. According to some embodiments, the proposed customized identifiers may be configured to redirect to a permanently established resource identifier for the networked resource. At box 865, the proposed customized identifiers are provided in various contexts for a predetermined time period. For example, the proposed customized identifiers may be provided on labels, signs, placards, billboards or bumper stickers, included in one or more audio or video signals (e.g., as spoken words or other sounds corresponding to the proposed customized identifiers, or as one or more still or moving images corresponding to the proposed customized identifiers), displayed on a web page, posted to a social network or microblog, or spoken in an audible signal or message, or presented in any other manner.

At box 870, the effectiveness of the proposed customized identifiers in the various contexts in which they were provided are monitored. For example, a proposed customized identifier may be deemed effective on any basis, including but not limited to a number of times that one or more users accessed a web page by way of the proposed customized identifier, or an amount of time that each of the users spent while visiting the web page. Alternatively, where the networked resource is affiliated with a commercial entity such as an online marketplace, the customized resource identifier may be deemed effective based on a number of transactions executed by users who accessed the networked resource by way of the customized resource identifier, or on an aggregate value of purchases made by such users.

At box 875, whether one of the proposed customized identifiers has a demonstrated effectiveness above a threshold is determined. For example, depending on the manner in which the effectiveness of a customized identifier is determined, e.g., a number of times that the networked resource was accessed by users via the customized identifier, an amount of time spent at the networked resource by such users, a number of transactions or an aggregate value of such transactions, it is determined whether one or more of the proposed customized identifiers has exceeded a predetermined threshold of effectiveness, e.g., a threshold number of time, a threshold amount of time, a threshold number of transactions or a threshold aggregate value of such transactions. If none of the proposed customized identifiers is determined to have an effectiveness in excess of the predetermined threshold, then the process returns to box 850, where two or more new proposed customized resource identifiers are generated for the networked resource using one or more of the words that were identified at box 840.

If one or more of the proposed customized identifiers has an effectiveness in excess of the predetermined threshold, however, then the process advances to box 880, where the proposed customized identifier having the greatest effectiveness is designated as the effective customized identifier of the networked resource. For example, if two shortened URLs are associated with a web page regarding the sale of a given item at an online marketplace and provided to prospective viewers for a predetermined period of time on a test basis, the shortened URL having the greatest number of transactions or the largest amount of aggregate sales during the predetermined period of time may be designated as the shortened identifier for the web page on a permanent basis. At box 890, the effective customized identifier is provided as a reference to the networked resource in one or more contexts, and the process ends.

Figure 9A:
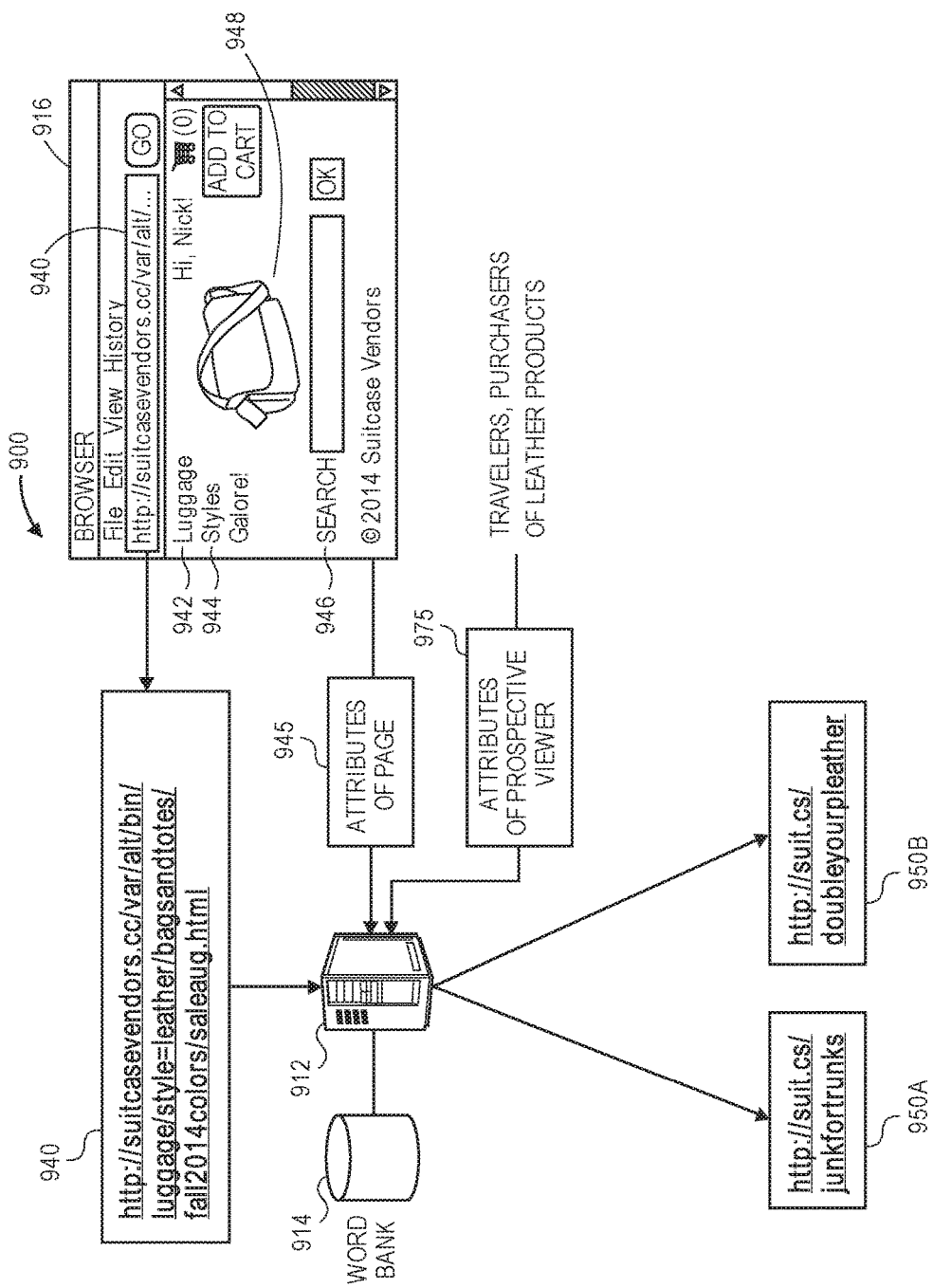
FIG. 9A is a flow diagram of one system for generating customized resource identifiers in accordance with embodiments of the present disclosure.
Figure 9B:
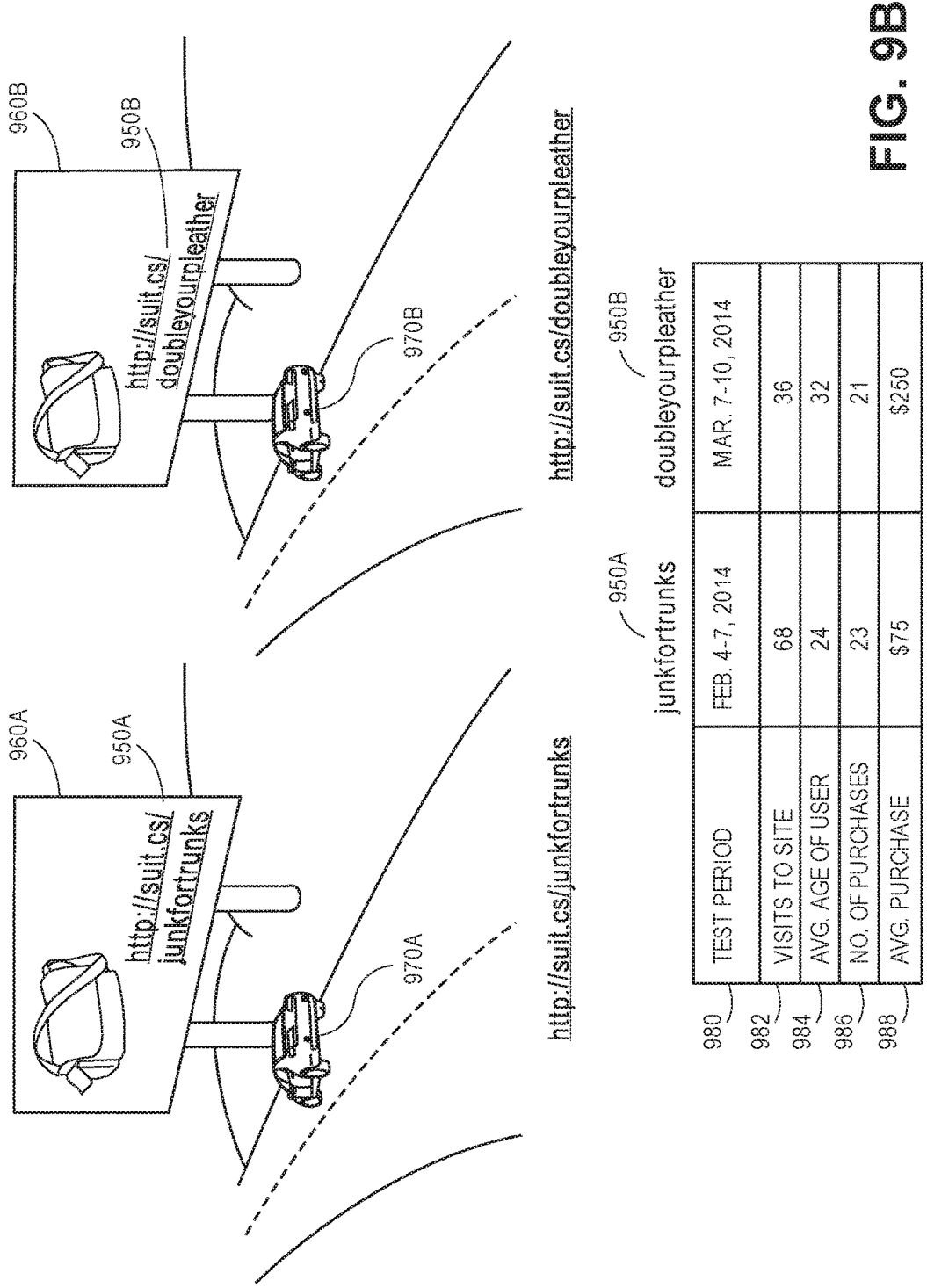
FIG. 9B is a view of one context for presenting a customized resource identifier generated in accordance with embodiments of the present disclosure.

The testing of two or more customized resource identifiers to determine their actual or relative effectiveness as a customized resource identifier of a network-based resource according to some embodiments of the present disclosure is shown in FIGS. 9A and 9B. Referring to FIG. 9A, a flow diagram of one system 900 for generating customized resource identifiers in accordance with embodiments of the present disclosure, and a view of contexts 960A, 960B in which such customized resource identifiers may be presented to prospective viewers on a test basis, are shown. Except where otherwise noted, reference numerals preceded by the number "9" in FIGS. 9A and 9B indicate components or features that are similar to components or features having reference numerals preceded by the number "5" in FIGS. 5A and 5B, by the number "2" in FIG. 2, or by the number "1" in FIG. 1, respectively.

As is shown in FIG. 9A, the system 900 includes a server 912, a data store 914 and a web page 916 having a substantially lengthy permanent URL 940. The data store 914 includes a bank of words, and the web page 916 includes a title or header 942 (viz., Luggage), a description 944, interactive features 946 and an image 948. The server 912 is configured to identify or receive attributes 945 of the web page 916 or attributes 975 of prospective viewers of the customized resource identifiers. Based at least in part on one or more of the attributes 945, 975, the server 912 is further configured to generate a pair of proposed customized resource identifiers 950A, 950B for the web page 916 that incorporates one or more of the words in the word bank 914, e.g., in a file path of a shortened domain name and file path associated with the web page 916. As is shown in FIG. 9A, the proposed customized resource identifiers generated for the luggage web site 916 include "suit.cs/junkfortrunks" 950A and "suit.cs/doubleyourpleather" 950B.

As is discussed above, the effectiveness of a customized resource identifier may be determined based on any relevant metric or factor. Referring to FIG. 9B, the customized resource identifiers 950A, 950B are shown as presented on a pair of billboards 960A, 960B for a pair of test periods 980 (viz., Feb. 4-7, 2014, and Mar. 7-10, 2014). As is shown in FIG. 9B, the presentation of the customized resource identifier 950A on the billboard 960A during the Feb. 4-7, 2014, time period resulted in sixty-eight visits 982 to the web page 916 by users having an average age 984 of twenty-four. Additionally, from the sixty-eight visits, a total of twenty-three purchases 986 were made, with an average purchase 988 of seventy-five dollars ($75). As is also shown in FIG. 9B, the presentation of the customized resource identifier 950B on the billboard 960B during the Mar. 7-10, 2014, time period resulted in thirty-six visits 982 to the web page 916 by users having an average age 984 of thirty-two. From the thirty-six visits, however, a total of twenty-one purchases 986 were made, with an average purchase 988 of two hundred fifty dollars ($250).

Therefore, the customized resource identifiers 950A, 950B may be determined to have varying degrees of effectiveness, depending on the purpose for which the customized resource identifiers 950A, 950B are intended. For example, because the customized resource identifier 950A resulted in more visits 982 from users of a younger age 984 and a larger number 986 of purchases, the customized resource identifier 950A may deemed more effective in contexts or situations in which larger numbers of visits and purchases, or visits from younger users, are desired. However, because the customized resource identifier 950B resulted in a higher ratio of purchases 986 to visits 982, and higher average purchase 988 amounts from users of an older age 984, the customized resource identifier 950B may be deemed more effective in contexts or situations in which more high-value purchases from older users are desired.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments of the present disclosure are shown as being utilized in connection with pages of information made available over the Internet, i.e., the World Wide Web, the systems and methods disclosed herein are not so limited, and may be provided in connection with any type of resource that may be made available for access via any type or form of network, including but not limited to documents (e.g., word processing documents, spreadsheets, presentations or the like), audio or video files (e.g., music files, movies, podcasts), applications, executable files or any other computer-based resource provided in any environment.

Furthermore, although some of the embodiments disclosed herein are directed to the generation of customized resource identifiers, such as URLs, based on combinations of two words, the systems and methods of the present disclosure are not so limited, and may be utilized to generate resource identifiers of any length and using any number of words of any type, category, tense or part of speech. Moreover, the contexts in which such customized resource identifiers may be presented to prospective viewers may include one or more visual or audible means and are not limited.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 6 and 8, the order in which the boxes or steps of the methods or processes are listed is not intended to be construed as a limitation on the claimed inventions, and any number of the boxes or steps can be omitted or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer system comprising:
   at least one processor;
   a memory comprising program instructions; and
   an output peripheral,
   wherein the program instructions are executable by the at least one processor to cause the computer system to at least:
      identify a parcel including at least one item intended for a user, wherein the parcel is to be delivered from an origin to a destination;
      determine at least one attribute of at least one of the origin, the destination, the user, or the at least one item;
      identify a combination of words, wherein at least one of the words of the combination is identified based at least in part on the at least one attribute of the at least one of the origin, the destination, the user or the at least one item;
      define a file path based at least in part on the combination of words;
      generate a customized resource locator for a network-based resource, wherein the customized resource locator comprises the file path;
      associate the customized resource locator with the network-based resource; and
      cause, by the output peripheral, the customized resource locator to be provided on the parcel.

2. The computer system of claim 1, wherein the output peripheral comprises a printing device, and
   wherein the program instructions are further executable by the at least one processor to cause the computer system to at least:
      print, by the printing device, the customized resource locator on at least one adhesive layer; and
      cause the at least one adhesive layer to be applied to the parcel.

3. The computer system of claim 1, wherein the program instructions are further executable by the at least one processor to cause the computer system to at least:
   identify a permanent resource locator for the network-based resource;
   determine a length of the permanent resource locator; and
   generate the customized resource locator having a length that is less than the length of the permanent resource locator.

4. A computer-implemented method comprising:
   identifying, by at least one processor, a parcel comprising at least a first item, wherein the parcel is intended for delivery from an origin to a destination in response to an order;
   determining, by the at least one processor, at least one attribute associated with at least one of:
      the parcel;
      the first item;
      the origin;
      the destination;
      a customer who placed the order; or
      an intended recipient of the parcel;
   identifying, by the at least one processor, at least a first word based at least in part on the at least one attribute;
   generating, by the at least one processor, a customized resource locator for a network-based resource comprising the first word and a second word;
   associating, by the at least one processor, the customized resource locator with the network-based resource; and
   causing the customized resource locator to be provided on at least a portion of an outer surface of the parcel.

5. The computer-implemented method of claim 4, further comprising:
   printing the customized resource locator on at least one of a shipping label, an adhesive label or an adhesive tape,
   wherein causing the customized resource locator to be provided on the outer surface of the parcel comprises:
      affixing the at least one of the shipping label, the adhesive label or the adhesive tape to at least the portion of the outer surface of the parcel.

6. The computer-implemented method of claim 4, wherein identifying at least the first word based at least in part on the at least one attribute comprises:
   identifying, by the at least one processor, the first word based at least in part on the at least one attribute; and
   identifying, by the at least one processor, the second word based at least in part on the at least one attribute.

7. The computer-implemented method of claim 4, wherein the network-based resource is a network page having a standard resource locator, and
   wherein a length of the customized resource locator is less than a length of the standard resource locator.

8. The computer-implemented method of claim 7, wherein the customized resource locator comprises a hostname and a file path, and
   wherein the file path comprises the first word and the second word.

9. The computer-implemented method of claim 7, wherein the first word precedes the second word in the file path, and
   wherein the first word and the second word are separated by a hyphen or a dot in the file path.

10. The computer-implemented method of claim 7, wherein at least the first word and the second word are related by at least one of:
    consonance;
    assonance; or
    alliteration.

11. The computer-implemented method of claim 7, wherein the first word is one of:
    an adjective associated with the at least one of the parcel, the first item, the origin, the destination, the customer or the intended recipient; or
    a noun associated with the at least one of the parcel, the first item, the origin, the destination, the customer or the intended recipient.

12. The computer-implemented method of claim 7, wherein determining the at least one attribute comprises:
 identifying, by the at least one processor, a second item associated with the at least one of the parcel, the first item, the origin, the destination, the customer or the intended recipient; and
 determining, by the at least one processor, an attribute of the second item, wherein the at least one attribute is the attribute of the second item,
 wherein the network-based resource is a network page comprising a name of the second item, a price of the second item, a detail of the second item and an image of the second item.

13. The computer-implemented method of claim 7, wherein the network page comprises information regarding at least an intended use of the first item, and
 wherein the first word relates to at least the intended use of the first item.

14. The computer-implemented method of claim 4, wherein identifying at least the first word based at least in part on the at least one attribute comprises:
 identifying a set of words by the at least one processor, wherein each of the words in the set is determined to be effective for use in customized resource locators; and
 selecting, by the at least one processor, one of the set of words based at least in part on the at least one attribute, wherein the first word is the selected one of the set of words.

15. The computer-implemented method of claim 14, wherein the at least one attribute is one of:
 an age of the intended recipient; or
 a location of the destination.

16. The computer-implemented method of claim 4, wherein
 identifying, by the at least one processor, a trademark associated with the first item; and
 generating, by the at least one processor, a parody of the trademark comprising the first word and the second word,
 wherein the customized resource locator comprises the parody.

17. A method comprising:
 receiving information regarding an order for at least a first item over a network, wherein the information regarding the order comprises:
  a name of a customer that placed the order;
  a name of at least the first item;
  a destination for at least the first item; and
  a name of an intended recipient of the item;
 determining an attribute of at least the first item;
 selecting a combination of words based at least in part on at least one of:
  the attribute of at least the first item;
  the name of the customer;
  the name of at least the first item;
  the destination; or
  the name of the intended recipient;
 generating a customized resource identifier for a network page, wherein the customized resource identifier comprises the combination of words;
 printing the customized resource identifier onto an adhesive label; and
 affixing the adhesive label to a parcel comprising at least the first item,
 wherein a length of the customized resource identifier is less than a length of a permanent resource identifier for the network page.

18. The method of claim 17, wherein the adhesive label is one of:
 a shipping label identifying at least the destination for at least the first item; or
 an adhesive tape, and
wherein affixing the adhesive label to the parcel comprises one of:
 applying the shipping label to at least one face of the parcel; or
 applying the adhesive tape to at least one edge of the parcel.

19. The method of claim 17, wherein selecting the combination of words comprises:
 identifying at least a second item based at least in part on the attribute of the item, wherein the network page comprises details regarding at least the second item.

20. The method of claim 19, wherein the combination of words comprises at least one adjective associated with the second item and at least one noun associated with the second item.

* * * * *